United States Patent [19]

Komeya et al.

[11] 3,833,389

[45] Sept. 3, 1974

[54] HEAT RESISTANT AND STRENGTHENED COMPOSITE MATERIALS AND METHOD FOR PRODUCING SAME

[75] Inventors: Katsutoshi Komeya, Kawasaki; Akihiko Tsuge, Yokohama; Hiroshi Inque, Kawaguchi; Hiroyuki Murata, Yokohama, all of Japan

[73] Assignee: Tokyo Shibaura Electric Co., Ltd., Kawask-shi, Japan

[22] Filed: Dec. 23, 1971

[21] Appl. No.: 211,728

[30] Foreign Application Priority Data

Dec. 23, 1970 Japan.............................. 45-115817

[52] U.S. Cl...................... 106/55, 106/44, 106/56, 116/65
[51] Int. Cl.................... C04b 35/52, C04b 35/56, C04b 35/58
[58] Field of Search............. 106/43, 44, 55, 65, 56

[56] References Cited

UNITED STATES PATENTS 3,108,887  10/1963  Lenie et al............................ 106/65

Primary Examiner—James E. Poer
Attorney, Agent, or Firm—Oblon, Fisher, Spivak, McClelland & Maier

[57] ABSTRACT

Heat resistant and strengthened composite materials are obtained by mixing, and sintering in a non-oxidizing atmosphere, the combination of powders of aluminum nitride and/or silicon nitride, with powders of an oxide of lanthanum, cerium, scandium, yttrium, and/or yttrium aluminum garnet, and with powders or whiskers of silicon carbide, boron nitride and/or carbon. The composite material so produced is characterized by high shock resistance and excellent mechanical strength.

4 Claims, No Drawings

HEAT RESISTANT AND STRENGTHENED COMPOSITE MATERIALS AND METHOD FOR PRODUCING SAME

BACKGROUND OF THE INVENTION

1. Field of the Invention

This invention relates to a method for preparing heat resistant and strengthened composite materials having extremely high heat shock resistance.

2. Description of the Prior Art

In recent years a significant demand has developed for high strength materials which are capable of maintaining their high strength characteristics even at high temperatures and extremely great heat shocks. Such heat resistant materials are finding applications in a wide range of fields; from space re-entry vehicles to heat resistant tool jigs.

The present applicants had previously disclosed a heat resistant and high strength composite material which was prepared by sintering a finely powdered mixture of aluminum nitride (AlN), at least one oxide of yttrium oxide ($Y_2O_3$), lanthanum oxide ($La_2O_3$), cerium oxide ($Ce_2O_3$), or scandium oxide ($Sc_2O_3$), and silicon oxide ($SiO_2$), or trisilicon tetranitride ($Si_3N_4$). (Japanese patent application No. 69308 of 1970, No. 62795 of 1970).

Those composite materials not only are characterized by high heat resistance and high strength, but were also more resistant to heat shock than previously known ceramic materials. Recently, however, a demand has arisen for materials having even greater heat shock resistance and even greater mechanical strength, for such applications as are intended to operate under even more severe conditions of temperature and heat shock.

A need exists, therefore, for a very high heat shock resistant and high strength composite material.

SUMMARY OF THE INVENTION

Accordingly, it is one object of this invention to provide a heat resistant composite material which is characterized by very high mechanical strength at high temperatures and extremely great resistance to heat shocks.

It is another object of this invention to provide a method for preparing heat resistant composite materials which are strengthened by use of an inner fabric structure and without the use of any external fibrous materials.

These and other objects have now herein been attained by providing heat resistant and high strength composite material by sintering a mixture of at least one compound selected from the group consisting of aluminum nitride and silicon nitride, at least one compound selected from the group consisting of oxide of lanthanum, cerium, scandium, yttrium and yttrium aluminum garnet, and at least one compound selected from the group consisting of silicon carbide, boron nitride and carbon, in a non-oxidizing atmosphere.

DETAILED DESCRIPTION OF THE INVENTION

The heat resistant composite materials of this invention are produced from a three-component mixture. The first component is a powder of aluminum nitride and/or trisilicon tetranitride. The second component is a powder of an oxide of lanthanum, cerium, scandium yttrium and/or yttrium aluminum garnet ($Y_3Al_5O_{12}$). The third component is a powder of silicon carbide, boron nitride and/or carbon. If desired, the third component may be in the form of fibers, e.g., "whiskers".

The component powders are mixed and suitably dispersed and the mixture pressed to shape. The shaped mixture is then sintered or hot pressed sintered in an nonoxidizing atmosphere.

The third component, i.e., the SiC, BN or C can be used in this composition in amounts of less than 50% by volume and preferably, in amounts of 1% – 30% by volume, if it is in the form of a powder and 1% – 20%, by volume, if it is in the form of whiskers. Greater amounts are not desirable since, it could adversely affect the sintering step. The maximum quantity of aluminum nitride or silicon nitride, i.e., the first component of this composition should be used in amounts of 1–97 weight percent of the total composition.

When the subsequent sintering step is carried out by hot press sintering the third component may be used in amounts of 50% by volume and the composition will show good resistance to heat shock.

The second component of the present composition is formed from an oxide of lanthanum, cerium, scandium, yttrium and yttrium aluminum garnet, or mixtures thereof. This component may be used in amounts of from 1% – 50% by weight. Greater amounts are not desirable since it can decrease the mechanical strength of the resulting composite.

Instead of using one of the above oxides, directly, a material which is capable of producing one of the oxides under the sintering conditions can also be used. For instance, instead of using yttrium oxide, a compound which is capable of forming yttrium oxide at the sintering temperatures such as yttrium carbonyl ($Y_2OC$) or yttrium hydroxide ($Y(OH)_3$ may be used.

Ordinary sintering is carried out at temperatures of 1600–2000°C if the first component is AlN, and 1300–1900°C if the first component is $Si_3N_4$. The upper limit of the sintering temperature is determined by the sublimation and decomposition temperatures of the first component nitride and the SiC, BN or C. The lower sintering temperature limit is the progressive reaction temperature.

Ordinary sintering is preferred for complex shapes because of its lower cost, whereas hot press sintering is desirable where a completely closed object is intended to be prepared. Hot press sintering temperatures may range from 1300° to 2400°C at pressures of from 20 to 1500 kg/cm².

When ordinary sintering is effected, it is preferred to heat in an inert, non-oxidizing atmosphere, such as in an atmosphere of nitrogen or argon. Sintering can be effected in a single heating step or in multiple heating steps.

The powder components, used in this invention, may have particle sizes of 0.4–40$\mu$, and the whisker components may have diameters of 0.5–40$\mu$ with lengths of from 40 to 100$\mu$.

A binder, such as stearic acid, may be used in minor amounts as needed. The quantity of binder used is not critical since during the sintering procedure, it will be decomposed or otherwise vaporized out of the system.

Various other heat resistant substances, such as the heat resistant oxides, nitrides, carbides, silicides, sulfides, or boron compounds may be added to the composition to attain specific characteristics. For instance, it is desirable to include minor amounts, i.e., 1–4% and preferably 2% by volume $SiO_2$ or $Al_2O_3$ in the composition. When the first component is AlN, it is desirable to use $SiO_2$, and when the first powder component is $Si_3N_4$, it is desirable to use $Al_2O_3$ in the composition.

The sintered product of this invention is a highly heat resistant and heat shock resistant material which is characterized by an inner fabric structure of fibrous crystals within the material, which is composed of fibrous crystals arranged substantially parallel to the surface.

This is a particularly good advantage of this invention as compared with those prior art heat resistant materials which are composed of surface fibers.

The three components of this invention can therefore, be summarized as follows:

the first component ..... AlN, $Si_3N_4$
the second component .... $La_2O_3$, $Ce_2O_3$, $Sc_2O_3$, $Y_2O_3$, $Y_3Al_5O_{12}$
$SiO_2$ can be used with AlN and $Al_2O_3$ can be used with $Si_3N_4$
the third component ..... SiC, BN, C (powder or whisker)

Having now generally described the invention, a further understanding can be obtained by reference to certain specific examples which are provided herein for purposes of illustration only and are not intended to be limiting unless otherwise specified.

EXAMPLE 1

90% by weight of aluminum nitride powder, having an average particle size of 1.2 microns, 10% by weight of yttrium oxide powder, having an average particle size of 1.6 microns, and 0, 5, 10, 20, 30, 50% by volume of silicon carbide powder, having an average particle size of 7 microns, or silicon carbide whiskers having a diameter of 10 microns, a length of from 40 to 100 microns, and 5% by weight of stearic acid, as a binder, were mixed. Each mixture was shaped into a large number of columnar pieces, 13 mm in diameter and 20 mm long, at a molding pressure of 5000 kg/cm². One of the test pieces thus formed was hot pressed in a hot pressing apparatus. Then the test piece was placed into a crucible made of aluminum nitride, and was packed with aluminum nitride powder. The test pieces were heated by the following rates of temperature rise in nitrogen gas atmosphere which was prepared by passing the gas through the crucible at a rate of 800 liters per hour.

| | |
|---|---|
| Room temperature to 300°C. | for two hours |
| 300°C to 400°C. | for four hours |
| 400°C to 1800°C. | for one hour |

After sintering for two hours at the temperature of 1800°C, the sintered test pieces were permitted to self-cool.

During sintering, the binder was decomposed and evaporated off.

The physical properties of the test pieces sintered are shown in Table 1.

TABLE 1

| Proportion of raw materials | | | | den-sity (%) | Bending strength (kg/mm²) | heat shock test*** |
|---|---|---|---|---|---|---|
| AlN | $Y_2O_3$ | SiC powder | SiC whisker | | | |
| weight % | | volume % | | | | |
| 90* | 10* | 0** | 0** | 98.4 | 37.5 | less than 10 times |
| 90* | 10* | 5** | 0** | 97.3 | 34.0 | 20–40 times |
| 90* | 10* | 10** | 0** | 95.2 | 30.1 | 50–100 times |
| 90* | 10* | 20** | 0** | 92.7 | 25.5 | more than 100 times |
| 90* | 10* | 30** | 0** | 88.2 | 17.5 | more than 100 times |
| 90* | 10* | 50** | 0** | 85.1 | 15.2 | more than 100 times |
| 90*' | 10* | 0** | 5** | 95.8 | 35.2 | 50–100 times |
| 90* | 10* | 0 | 10** | 93.2 | 28.4 | more than 100 times |
| 90* | 10* | 0** | 20** | 90.5 | 21.8 | more than 100 times |
| 90* | 10* | 0** | 30** | 85.2 | 13.7 | more than 100 times |
| 90* | 10* | 0** | 50** | 80.3 | 10.5 | more than 100 times |

\* represents the amount charged as AlN–$Y_2O_3$ system.
\*\* represents the amount of SiC added to AlN–$Y_2O_3$ system.
\*\*\* represents the number of heat shocks before cracks appeared.

As shown in Table 1, if the amount of SiC added increases, the density decreases. Therefore, it is preferable that the amount of SiC used be less than 30% volume if it is in the form of a powder, and less than 20% by volume if it is in the form of fibers or whiskers.

These samples were cut and shaped into $10\phi \times 5$ mm (low cylinder shape), and were finished by mirror polishing. They were then subjected to a heat shock test by being placed in an electric furnace heated to 1000°C (in an atmosphere of air). After 5 minutes they were removed from the furnace, and cooled rapidly by being dipped into water.

A definite increase in heat shock resistance was noted when the composition contained SiN.

The dimensions of the heating chamber, which was of the elevator type electric furnace, with a silicon carbide heater, was 300 mm × 300 mm × 400 mm.

EXAMPLE 2

Ninety % by weight of silicon nitride powder having an average particle size of 1.0 micron, 10% by weight of yttrium oxide powder, having an average particle size of 1.6 microns, and 10% by volume of silicon carbide, or powder were mixed. The mixture was shaped into a large number of cylindrical pieces, 13 mm in diameter and 10 mm long, under a molding pressure of 5000 kg/cm². One of the test pieces thus formed was hot pressed in a hot pressing apparatus. The test pieces were heated to a temperature of 1700°C in an argon gas atmosphere to effect sintering. The heat shock resistance for these test pieces was measured as in Example 1. It was found that the SiC containing test pieces had high shock resistance.

TABLE 2

EXAMPLE 3-20

| No. of Example | Proportion of raw materials (weight %) | | | Condition of sintering | | Density | Heat shock test (time) |
|---|---|---|---|---|---|---|---|
| | | | | Temp. (°C) | Method | | |
| 3 | AlN 90 | $Y_2O_3$ 10 | BN (P) 10 | 1800 | A | 97.5 | 50 to 100 |
| 4 | AlN 90 | $Y_2O_3$ 10 | BN (W) 10 | 1800 | A | 95.2 | more than 100 |
| 5 | AlN 90 | $Y_2O_3$ 10 | BN (P) 10 | 1800 | A | 98.1 | 50 to 100 |
| 6 | AlN 90 | $Y_2O_3$ 10 | CN (P) 10 | 1800 | A | 97.8 | more than 100 |
| 7 | AlN 90 | $Y_2O_3$ 10 | C (W) 10 | 1800 | A | 95.5 | more than 100 |
| 8 | AlN 90 | $Y_2O_3$ 10 | C (W) 5 | 1800 | A | 97.7 | more than 100 |
| 9 | AlN 90 | $Y_2O_3$ 10 | SiC (P) 30 | 1800 | B | 98.5 | more than 100 |
| 10 | AlN 90 | $Y_2O_3$ 10 | SiC (W) 30 | 1800 | B | 98.5 | more than 100 |
| 11 | AlN 90 | $Y_2O_3$ 20 | SiC (W) 10 | 1700 | A | 96.5 | 50 to 100 |
| 12 | AlN 90 | $Y_2O_3$ 8 | SiC (W) 10 $SiO_2$ 2 (vol. %) | 1800 | A | 98.1 | more than 100 |
| 13 | $Si_3N_4$ 90 | $Y_2O_3$ 10 | BN (W) 10 | 1800 | A | 95.6 | more than 100 |
| 14 | $Si_3N_4$ 90 | $Y_2O_3$ 10 | C (P) 10 | 1700 | A | 94.5 | more than 100 |
| 15 | $Si_3N_4$ 90 | $Y_2O_3$ 10 | C (W) 10 | 1700 | A | 97.1 | more than 100 |
| 16 | $Si_3N_4$ 90 | $Y_2O_3$ 8 | SiC (W) 10 $Al_2O_3$ 2 (vol. %) | 1700 | A | 96.0 | more than 100 |
| 17 | $Si_3N_4$ 90 | $Y_2O_3$ 8 | SiC (W) 10 $Al_2O_3$ 2 (vol. %) | 1700 | B | 98.8 | more than 100 |
| 18 | AlN. $Si_3N_4$ (1:1) 90 | $Y_2O_3$ 10 | SiC (W) 10 | 1750 | A | 97.5 | more than 100 |
| 19 | $Si_3N_4$ 90 | $La_2O_3$ 10 | SiC (W) 5 | 1700 | A | 96.5 | more than 100 |
| 20 | AlN 80 | $La_2O_3$ 20 | SiC (W) 5 | 1700 | A | 97.8 | 50 to 100 |
| Control 1 | $Si_3N_4$ 90 | $Y_2O_3$ 10 | 0 | 1700 | A | 98.0 | less than 20 |
| Control 2 | AlN. $Si_3N_4$ (1:1) 90 | 10 | 0 | 1750 | A | 98.5 | less than 90 |

(P) shown in Table 2 represents "Powder".
(W) shown in Table 2 represents "Whisker".
The proportions of $SiO_2$ and $Al_2O_3$ shown as raw materials in Table 2 represents "Volume %".

The yttrium oxide in the above example can be entirely or partly replaced with cerium oxide ($Ce_2O_3$), or scandium oxide ($Sc_2O_3$), lanthanum oxide, or yttrium aluminum garnet, with substantially the same results. Namely, by adding SiC, BN or C to the mixture of the above first and the second components, good heat shock resistance can be obtained.

Having now fully described the invention, it will be apparent to one of ordinary skill in the art that many changes and modifications can be made without departing from the spirit or scope of the invention.

What is claimed as new and desired to be secured by Letters Patent of the United States is:

1. A heat resistant composite material formed by sintering a mixture of powdered silicon nitride and a second powdered component selected from the group consisting of an oxide of lanthanum, cerium, scandium, yttrium, yttrium aluminum garnet and mixtures thereof, and with a third component selected from the group consisting of silicon carbide, boron nitride, carbon and mixtures thereof.

2. The heat resistant material of claim 1 wherein the second component materials are present in an amount of up to 50% by weight of the mixture.

3. The heat resistant material of claim 1 wherein the third component materials are used in amounts of less than 50% by volume.

4. The heat resistant material of claim 1 which contains a fibrous crystalline structure which is substantially parallel to the surface of said material.

* * * * *